June 17, 1947.    G. F. LAING    2,422,306
VARIABLE SPEED MECHANISM
Filed July 28, 1944    2 Sheets-Sheet 1
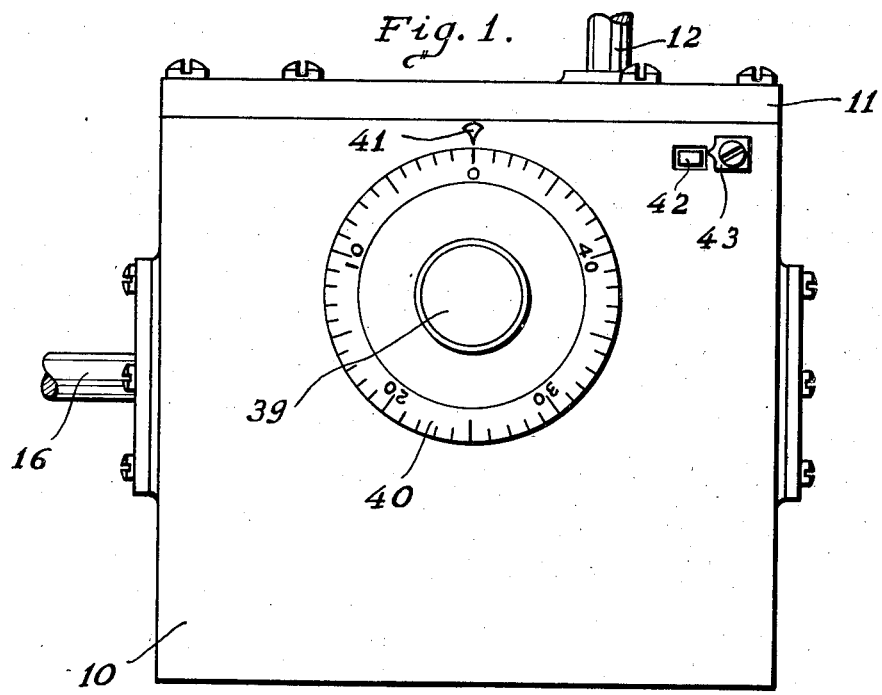
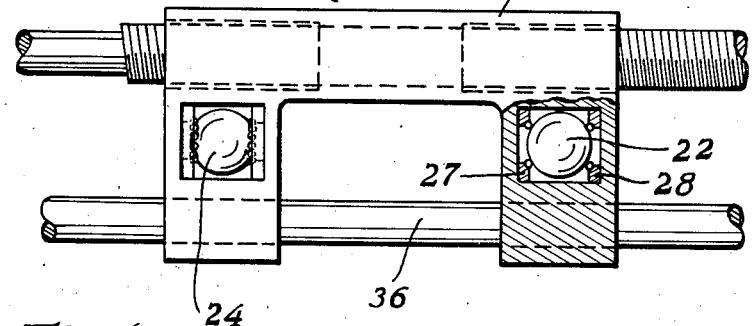
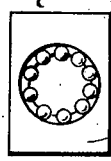
INVENTOR.
GORDON F. LAING
BY
R. G. Richardson
ATTY.

June 17, 1947.                 G. F. LAING                 2,422,306
                        VARIABLE SPEED MECHANISM
                          Filed July 28, 1944           2 Sheets-Sheet 2

INVENTOR.
GORDON F. LAING
BY
R G Richardson
            ATTY.

Patented June 17, 1947

2,422,306

UNITED STATES PATENT OFFICE 2,422,306

VARIABLE SPEED MECHANISM

Gordon F. Laing, Delavan, Wis., assignor to The George W. Borg Corporation, Chicago, Ill., a corporation of Delaware Application July 28, 1944, Serial No. 547,041

9 Claims. (Cl. 74—198)

The present invention relates in general to variable speed mechanisms; and the object of the invention is to produce a new and improved mechanism of this character.

More in particular, the object of the invention is the production of a simple and efficient variable speed mechanism by means of which an output speed varying by extremely small increments over a wide range may be derived from a given input speed, the arrangement being such, moreover, that any desired output speed within the range of the mechanism may be accurately predetermined and reproduced at will.

The invention may have various applications, but is especially useful as a variable speed wire pulling mechanism for the production of tapered conductors as disclosed in the pending application of Thomas B. Gibbs et al., Ser. No. 525,764, filed March 9, 1944.

The invention will be described more in detail hereinafter, reference being had to the accompanying drawings, in which—

Fig. 1 is a front view of a variable speed mechanism embodying the invention;

Fig. 3 is a detail showing the construction of the adjustable yoke for supporting the idler balls; and Fig. 4 is a plan view of one of the ball races used in the bearings for the idler balls.

Figure 2:
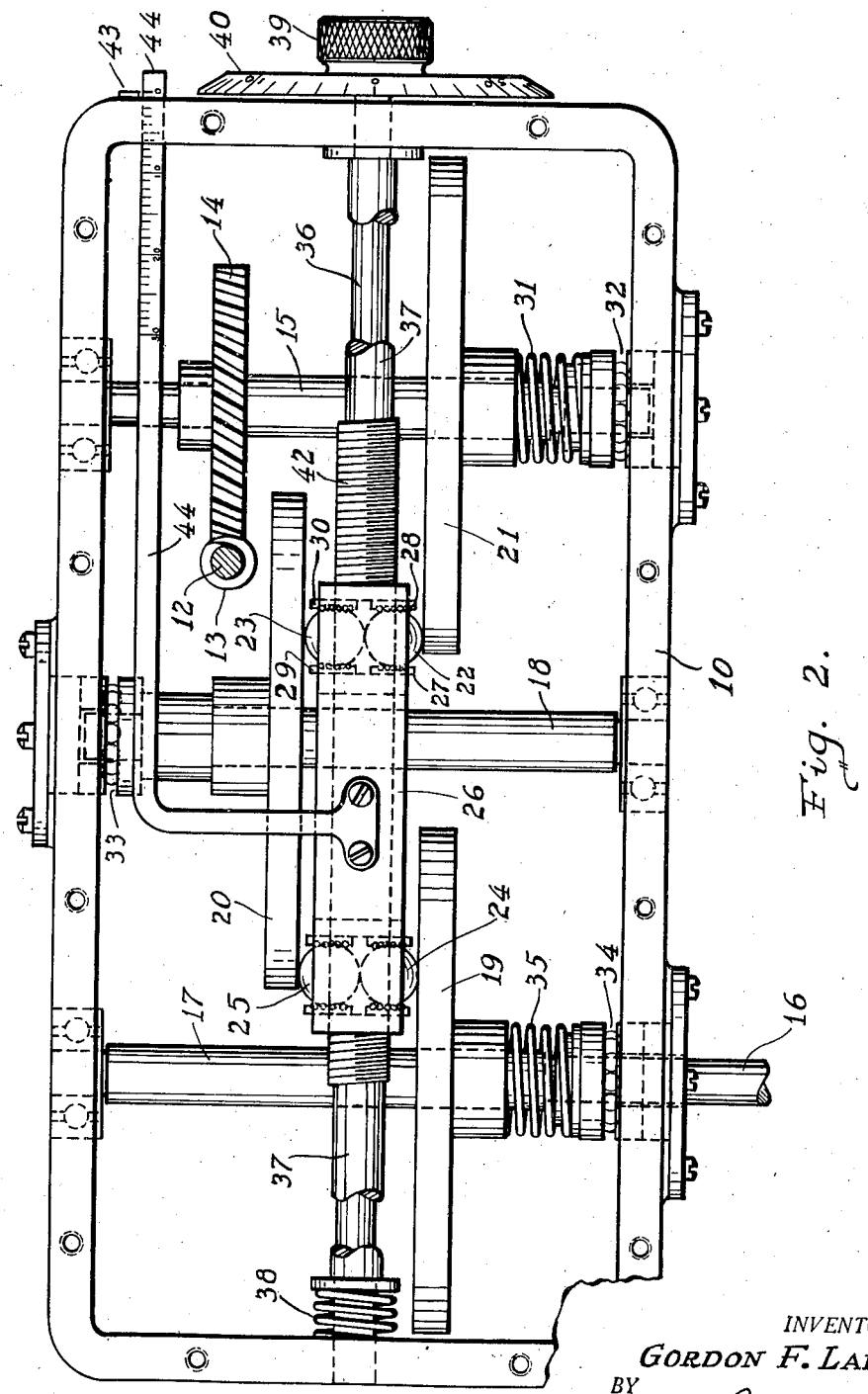
Fig. 2 is a top view of the same, with the cover removed.

Referring to the drawings, the reference character 10 indicates a suitable casing, the shape of which will be readily understood from Figs. 1 and 2. The casing may be an iron casting, or it may be fabricated from steel plates secured together by machine screws, or in any suitable manner, as by welding. A cover 11 is provided, shown only in Fig. 1, and is removably secured to the casing by machine screws as shown.

The input shaft is indicated at 12 and may be driven in any suitable manner. It may be, for example, the shaft of a small motor mounted on the cover 11, and in this case no additional bearings will usually be required. A bearing may be provided at the cover 11, however, if desired, and also at the bottom of the casing.

The shaft 12 carries a worm 13, which is in mesh with the worm gear 14. Gear 14 is carried on the transverse shaft 15, which has suitable bearings in the sides of the casing 10 as shown.

The output shaft is indicated at 16 and is an extension of the transverse shaft 17 which is similar to shaft 15 and is provided with similar bearings in the sides of the casing.

The intermediate shaft 18 is similar to shafts 15 and 17. The bearings are the same also, except that whereas the thrust bearings 32 and 34 for shafts 15 and 17 are in the same wall of the casing the thrust bearing 33 for shaft 18 is in the opposite wall.

The shaft 17 is driven from shaft 15 by means of the three discs 19, 20 and 21, mounted on shafts 17, 18 and 15, respectively, and two sets of idler balls for coupling the discs together. The first set comprises idler balls 22 and 23, which transmit motion from disc 21 to disc 20. The second set, for transmitting motion from disc 20 to disc 19, comprises the idler balls 24 and 25. The discs and balls are preferably made of hardened steel.

The three shafts 17, 18 and 15 are in horizontal alignment. The idler balls of each set are aligned on a thrust axis which is parallel to and in the same horizontal plane as the shafts.

The two sets of idler balls are supported by means of ball bearings on a yoke 26. The bearing for the ball 22 of the first set includes the two ball races 27 and 28, indicated in Fig. 2 and shown clearly in Fig. 3. The ball race 27 is also shown in Fig. 4. The races 27 and 28 are fitted at the opposite sides of a rectangular opening in the yoke 26 and are restrained against movement in two directions but are free to slide in a third direction, i. e., in a direction parallel to the thrust axis of the balls 22 and 23. It will thus be seen that the races 27 and 28 and their associated balls support the ball 22 for rotation about an axis which is perpendicular to the thrust axis of the balls 22 and 23 and that the rotational axis is movable in the direction of the thrust axis to accommodate any slight movement of the ball 22 along this axis that may be required. Ball 23 is supported by the ball races 29 and 30 and their associated balls in the same way as described in the case of ball 22.

The arrangement for supporting balls 24 and 25 of the second set may be identical with the described arrangement for the first set.

The necessary force to supply driving friction for the balls 22 and 23 is applied along the thrust axis of the balls by means of the heavy spring 31, which is compressed between the hub of disc 21 and the inner race of the thrust bearing 32. The force is applied through disc 21, balls 22 and 23, and disc 20, and is taken up by the thrust bearing 33 which supports one end of the shaft 18.

The arrangement for supplying driving friction for balls 24 and 25 includes the heavy spring 35 and is the same as that described in the case of balls 22 and 23.

The yoke 26 is slidable on the rod 36, which extends lengthwise of the casing 10 just below the shafts 17, 18 and 15 and is fixed to the ends of the casing. Above the shafts 17, 18 and 15 and extending parallel to the rod 36 there is a shaft 37 which has bearings in the ends of the casing. A spring 38 is provided to take up end-wise play in the bearings. The right hand end of shaft 37 projects through the end wall of the casing where it is provided with a knob 39, having a calibrated dial 40. An index 41 on the front of the casing cooperates with the dial 40. The shaft 37, when rotated, slides the yoke 26 on the rod 36 and to this end is provided with a screw thread 42 which engages a corresponding thread in the yoke. During this movement of the yoke the balls 22 and 23 and 24 and 25 move radially with respect to the discs 21, 20 and 19.

In order to indicate the position of the yoke and the idler balls with reference to the discs, a calibrated bar 44 is provided. This bar is attached to the yoke 26 as shown and projects through the front wall of the casing along side of an index 43. The bar may be calibrated in terms of the pitch of the thread 42. The calibrated bar can then be read as turns of the shaft 37 from the extreme or zero position and the dial 40 can be read as a fractional part of one turn of the shaft.

The casing 10 should be partly filled with a good grade of lubricating oil, enough oil being used so that the rotation of the parts will be effective to lubricate the bearings.

The mechanism having been described, its operation may now be explained briefly.

As previously mentioned, power may be applied to the shaft 12 in any suitable manner. Assuming that a motor is used for this purpose, when the motor is started the shaft 12 drives the shaft 15 by means of worm 13 and worm gear 14. The disc 21, carried on shaft 15, drives the ball 22, which drives the ball 23, and the latter ball in turn drives the disc 20 on shaft 18. There is a gain in speed in the drive between the discs 21 and 20 due to the fact that ball 22 engages disc 21 at points lying on a circle of relatively large diameter (nearly equal to the diameter of the disc), whereas the ball 23 engages disc 20 at points lying on a circle which is considerably smaller in diameter. The rotating disc 20 drives ball 25, ball 25 drives ball 24, and the latter ball drives the disc 19 on shaft 17. There is another and similar gain in speed in the drive between discs 20 and 19.

The output shaft 16, connected to shaft 17, is now being rotated at its maximum speed, corresponding to the zero setting of the indicator bar 44 and the dial 40. In this connection, it will be noted that the indicator bar is so related to the position of the yoke that the bar reads zero when the balls 25 and 22 are at some distance from the edges of discs 20 and 21, respectively; and that a somewhat higher speed of the output shaft could be attained by movement of the yoke still farther to the left. There is no danger of the balls slipping off the discs, for the yoke 26 will engage shaft 18 before this can happen, but it is not desirable to run the balls too close to the edges of the discs and accordingly the indicator bar is preferably arranged approximately as shown. That is, when it reads zero it indicates the limit of the speed range which is considered to be usable rather than the absolute limit.

In order to reduce the speed of the output shaft 16, the knob 39 is turned in a clockwise direction as seen in Fig. 1, thereby rotating shaft 37 and moving the yoke 26 and the idler balls to the right as seen in Fig. 2. The limit of movement in this direction is arrived at when the yoke engages the shaft 18, which it will do before the balls 24 and 23 can slip off the discs 19 and 20. In practice, however, the yoke will not be moved quite so far, for reason pointed out above. With the yoke in its right hand position the output shaft is rotated at its slowest speed, corresponding to a reading of the indicator bar 44 which depends on the range of yoke movement and the pitch of the screw thread 42. With the mechanism shown, the range of movement of the yoke 26 is about 18 turns of the shaft 37, and an indicator bar reading of 18 therefore corresponds to the lowest working speed of the output shaft.

Any desired intermediate speed for the output shaft 16 can be obtained by properly adjusting the yoke 26 by means of the shaft 37 and knob 39. In this operation the indicator bar 44 counts the complete rotations of the shaft while the dial 40 acts as a vernier and enables the operator to read an incompleted rotation of the shaft to a small fraction. Since there are 50 divisions on the dial it will be clear that if the yoke has a range of movement corresponding to 18 turns of the shaft 37, 900 different settings can be made without interpolation, each setting corresponding to a different output speed.

In the manufacture of tapered conductors as disclosed in the application previously referred to herein, the conductor or wire to be tapered is made the anode in a system of electrolytic cells and successive sections of the wire are pulled through the cells at progressively lower speeds in order to subject them to anodic reduction for progressively longer periods and thus reduce the wire to a tapered formation. The production of tapered wire according to this method required a variable speed wire pulling mechanism, as will readily be appreciated.

The variable speed mechanism disclosed herein is well adapted for this purpose, as will be explained briefly.

The shaft 12 is driven by a synchronous motor, which is preferably driven from a source of current of constant frequency so that the input speed to the variable speed mechanism will be constant. The output shaft 16 is coupled by suitable gears to the shaft which carries the take up spool for the wire to be tapered, rotation of this spool being effective to pull the wire through the electrolytic cells. The gear ratio is so related to the motor speed that the variable speed mechanism will cover the range of wire pulling speeds required.

The wire pulling speeds for the different sections of the wire are accurately calculated and are expressed in seconds per foot. A curve or chart is therefore required by means of which the proper setting of the variable speed mechanism for any desired wire speed can be found. A curve is perhaps the most convenient to use and can be constructed by timing the variable speed mechanism at different settings thereof and then plotting the speeds thus obtained against the settings on suitable coordinate paper.

The curve can be used for ascertaining the correct setting for any wire speed within the range of the mechanism. For making any particular taper the settings corresponding to the different speeds are taken from the curve and are noted down. The wire is then pulled through the tapering apparatus, starting at the proper speed, and as each section leaves the apparatus the speed is changed by changing the setting of the variable speed mechanism.

As an example of the range of wire pulling speeds that can be covered, it may be stated that with a variable speed mechanism constructed substantially as shown in the drawings, except that the pitch of the threads 42 on shaft 37 was 20 threads to the inch, the wire speed corresponding to zero setting of the variable speed mechanism was 13 seconds per foot, while the wire speed corresponding to a setting of 19 was 457 seconds per foot. This is a sufficient range for the intended purpose, but could be increased if desired by increasing the diameter of the discs, which would permit a greater range of movement of the yoke 26.

With loads such as are imposed by the wire tapering apparatus, and even with considerably greater loads, there is no appreciable slippage in the drive. Experience has shown that so long as the input speed remains constant a given setting will always produce the same output speed.

The invention having been described, that which is believed to be new and for which the protection of Letters Patent is desired will be pointed out in the appended claims.

I claim:

1. In a variable speed mechanism, three discs, means supporting said discs for rotation with the second disc overlapping the first and third discs, two serially related balls coupling the first and second discs, two serially related balls coupling the second and third discs, and means for simultaneously moving both sets of balls to change the ratio of coupling, said last means including a support adapted to maintain said sets of balls a fixed distance apart on a diameter of the second disc.

2. In a variable speed mechanism, three discs, means supporting said discs for rotation with the second disc overlapping the first and third discs, two serially related balls coupling the first and second discs, two serially related balls coupling the second and third discs, resilient means tending to move said first and third discs toward said second disc to supply driving friction between said discs and balls, and means for simultaneously moving both sets of balls along radii of said discs, said last means including a support adapted to maintain said sets of balls a fixed distance apart on a diameter of the second disc.

3. In a variable speed mechanism, three discs, means supporting said discs for rotation with the second disc overlapping the first and third discs, two serially related balls coupling the first and second discs, two serially related balls coupling the second and third discs, means including a yoke for rotatably supporting said balls, and means including a rotatable shaft threaded in said yoke for moving the same to change the position of said balls relative to the rotational axes of said discs.

4. In a variable speed mechanism, a rotatable disc, a second rotatable disc disposed in overlapping relation to said first disc, two serially related balls for coupling said discs together, and means including ball bearings for supporting said balls, each ball bearing comprising a plurality of balls engaging one of said coupling balls.

5. In a variable speed mechanism, two discs, means supporting said discs for rotation in overlapping relation on parallel axes, two serially related balls for coupling said discs, means for maintaining said balls in alignment along a line parallel to said axes, said last means comprising a movable support and ball bearings for said balls movably mounted on said support, and mounting means for each said ball bearing limiting the movement thereof to a direction which is parallel to the line on which said coupling balls are aligned.

6. In a variable speed mechanism, two discs, means supporting said discs for rotation in overlapping relation on parallel axes, two balls operatively disposed on a line normal to said discs to transmit power from one disc to the other, and means including ball bearings for supporting said balls for rotation on axes perpendicular to said line, said bearings including ball races supported for movement in a direction parallel to said line.

7. In a variable speed mechanism, three shafts supported parallel to each other in the same plane, three discs carried on said shafts, respectively, in overlapping relation to each other, a set of balls coupling the first and second discs, a second set of balls coupling the second and third discs, a fixed rod or bar extending perpendicularly past said shafts in spaced relation thereto, a lead screw extending parallel to said bar on the opposite side of said three shafts, a yoke supported on said bar and lead screw and slidable on said bar responsive to rotation of said lead screw, and supporting means for said coupling balls carried by said yoke.

8. In a variable speed mechanism, three discs, means supporting said discs for rotation with the second disc overlapping the first and third discs, a set of serially related balls coupling the first and second discs, a set of serially related balls coupling the second and third discs, resilient means for maintaining said discs in frictional driving engagement with said balls, a common support for both sets of balls, means for moving said support to move both sets of balls simultaneously along radii of said discs, and individual supporting means for each set of balls carried on said common support, said individual supporting means being movable on said common support in a direction perpendicular to said discs.

9. In a variable speed mechanism, a rotatable disc, a second rotatable disc disposed in overlapping relation to said first disc, two serially related balls for coupling said discs together, and two oppositely disposed ball bearings for supporting each of said coupling balls, each ball bearing comprising a circular ball race and a plurality of balls confined thereby which engage the associated coupling ball.

GORDON F. LAING.

REFERENCES CITED

The following references are of record in the file of this patent:

UNITED STATES PATENTS

| Number | Name | Date |
|---|---|---|
| 2,325,323 | Johnson et al. | July 27, 1943 |
| 2,357,035 | Treese et al. | Aug. 29, 1944 |
| 2,209,254 | Ahnger | July 23, 1940 |
| 1,066,853 | Sipp | July 8, 1913 |
| 1,081,636 | Sundh | Dec. 16, 1913 |
| 1,803,834 | Bates | May 5, 1931 |
| 2,132,801 | Perruca | Oct. 11, 1938 |
| 692,391 | Wagner | Feb. 4, 1902 |
| 684,191 | Chatham | Oct. 8, 1901 |

FOREIGN PATENTS

| Number | Country | Date |
|---|---|---|
| 87,088 | Austria | Jan. 25, 1922 |
| 19,771 | France | Apr. 27, 1915 |
| 816,982 | France | May 10, 1937 |